United States Patent
Conti

(10) Patent No.: US 8,384,036 B2
(45) Date of Patent: Feb. 26, 2013

(54) POSITRON EMISSION TOMOGRAPHY (PET) IMAGING USING SCATTERED AND UNSCATTERED PHOTONS

(75) Inventor: Maurizio Conti, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 749 days.

(21) Appl. No.: 12/558,041

(22) Filed: Sep. 11, 2009

(65) Prior Publication Data

US 2010/0059682 A1    Mar. 11, 2010

Related U.S. Application Data

(60) Provisional application No. 61/095,980, filed on Sep. 11, 2008.

(51) Int. Cl.
*G01T 1/161*    (2006.01)

(52) U.S. Cl. ......... 250/363.03; 250/363.07; 250/370.08; 250/370.09

(58) Field of Classification Search ........... 250/363.023, 250/63.03, 363.04, 363.05, 363.06, 363.07, 250/363.08, 363.09, 363.11, 370.1, 370.13, 250/370.09, 370.11, 362

See application file for complete search history.

(56) References Cited

U.S. PATENT DOCUMENTS

2010/0148075 A1*    6/2010    Chinn et al. ................. 250/362

* cited by examiner

*Primary Examiner* — David Porta
*Assistant Examiner* — Yara Green
(74) *Attorney, Agent, or Firm* — Peter Kendall

(57) ABSTRACT

Determining the position of a radioactive source in a PET system. Detecting a scatter coincidence event characterized by a full-energy photon detected at a first detector and partial-energy photon at a second detector. Measuring the arrival time difference between the partial energy photon and the full energy photon. Measuring the energy of the partial-energy photon. Determining a scattering point as a function of the position of the first detector, the position of the second detector, the energy of the partial-energy photon, the energy of an unscattered photon, the mass of a scattering electron, and the speed of light. Determining the position of a radioactive PET source along a line between the scatter point and the first detector as a function of the distance between scatter point and the first detector, the distance between scatter point and the second detector, and the measured time difference.

12 Claims, 4 Drawing Sheets

POSITRON EMISSION TOMOGRAPHY (PET) IMAGING USING SCATTERED AND UNSCATTERED PHOTONS

CROSS REFERENCE TO RELATED APPLICATIONS

The present application claims the priority benefit of pending U.S. Provisional Patent Application No. 61/095,980 titled "Method to Perform PET Image Reconstruction Using Both Scattered and Unscattered Photons," filed Sep. 11, 2008 (the "Provisional Application"). The complete disclosure of the Provisional Application is hereby incorporated herein by reference in its entirety.

BACKGROUND

In Positron Emission Tomography (PET) an annihilation event is identified by time coincidence between the detection of two 511 keV, annihilation photons in two different detectors located around the patient. If two detectors A and B are hit coincidentally by full-energy photons, the detectors estimate a Line-of-Response (LOR) along which an annihilation has occurred. The position of the annihilation (and therefore the position of the radioactive source) along this line is not known, but existing technology reconstructs the image of the original radioactivity distribution from the large set of LORs identified by detector pairs in coincidence.

A large fraction of the 511 keV photons emitted during the decay and annihilation process undergo scatter before exiting the patient's body, mainly Compton scatter, during which they lose energy. 511 keV energy photons that reach the detectors are called "true" or "unscattered" photons. Photons with energy lower than 511 keV at the detectors are called "scattered" photons. A time coincidence of two detected photons is called a "coincidence event." A true coincidence event is an event in which both detected photons have 511 keV energy. A scatter coincidence event is an event in which one or both detected photons are scattered photons.

DETAILED DESCRIPTION

Reference will now be made in detail to embodiments of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one embodiment can be used on another embodiment to yield a still further embodiment. Thus, it is intended that the present technology cover such modifications and variations that come within the scope of the technology.

The technology can recover positional information from photons scattered in the patient during positron emission tomography (PET), and use scattered photons in PET image reconstruction in addition to unscattered photons. The technology uses energy and time-of-flight combined information to locate a radioactive (PET) source in the case at least one of the emitted photons undergoes Compton scatter before being detected.

The technology enables scatter events, presently rejected in PET scanners, to be used for reconstruction, increasing PET scanner sensitivity as measured by effective number of coincidence events per unit dosage. The technology can allow increased PET sensitivity for a given dose by, and can allow for lower doses for a given sensitivity.

A scattered photon has lost its original direction, and the LOR connecting two detectors in coincidence does not contain the source if one or both the detected photons are scattered, and cannot be used by present conventional PET reconstruction algorithms. For this reason, scattered events are not used in PET image reconstruction. They are usually rejected using one or both of two methods: discriminating on the energy of the detected photon, and subtracting estimated scatter events from the total events.

The energy discrimination is performed by rejecting detected photons with energy below a threshold, for example 400 keV, Not all scatter events are rejected by energy discrimination. Scatter estimation is usually based on a simulation that estimates the amount of scattered events still accepted by the energy discrimination process. As a consequence of this process, only a small fraction of the events are accepted and used for image reconstruction, only the events considered "unscattered." The overall result is the rejection of the large majority of the coincidence events, reducing the scanner sensitivity.

The technology disclosed herein aims to recover some of the loss of sensitivity due to this process by accepting scattered events to be used for image reconstruction.

Figure 1:
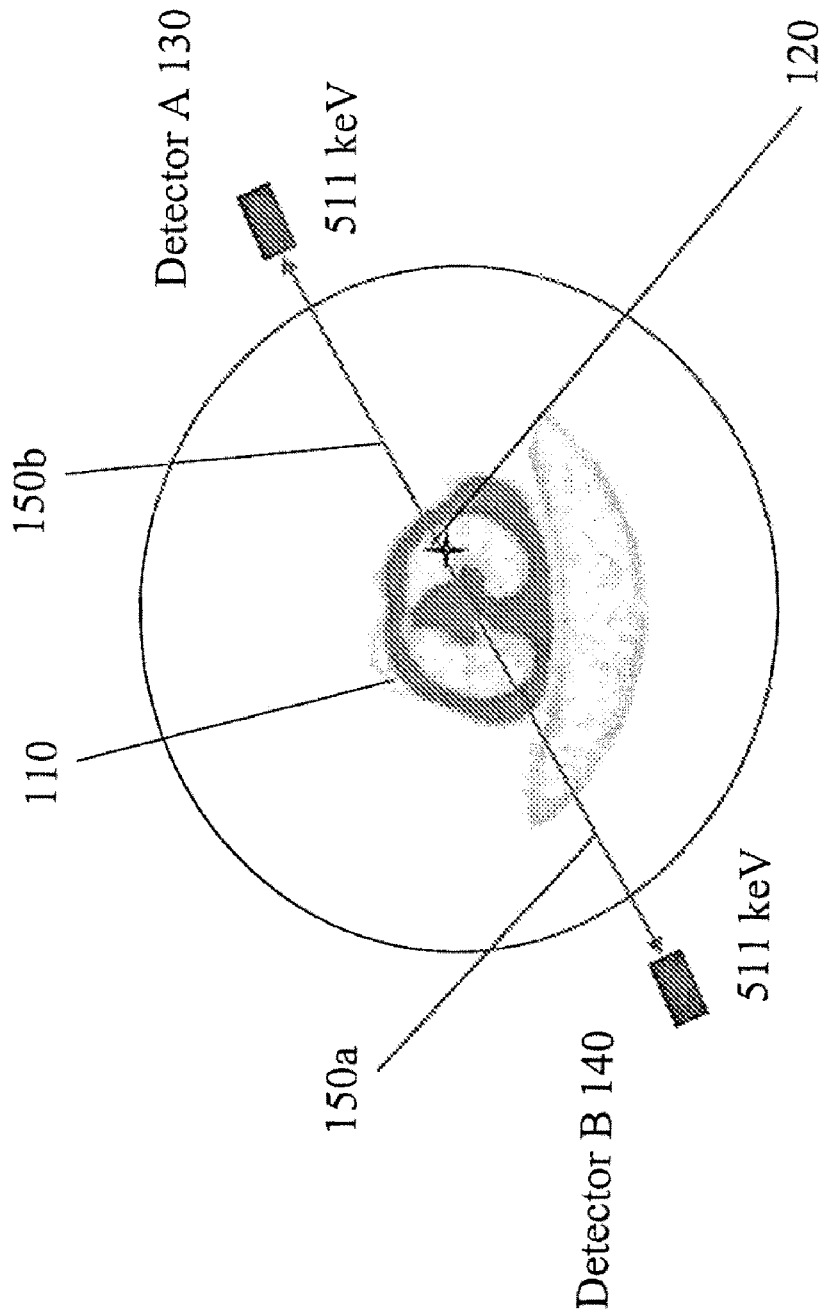
FIG. 1 illustrates a cross section of a patient in a PET scanner with a source of unscattered photons and a pair of detectors A and B. Unscattered photons allow estimation of a line passing through the source.

FIG. 1 illustrates a cross section 110 of a patient in a PET scanner with a source 120 of unscattered photons and a pair of detectors, A 130 and B 140. If two unscattered photons (paths indicated by 150a and 150b, energy upon arrival at each detector about 511 keV) are detected in time coincidence at detector A 130 and detector B 140, then the straight line drawn between detector A 130 and B 150 estimates a line passing through the source 120.

Figure 2:
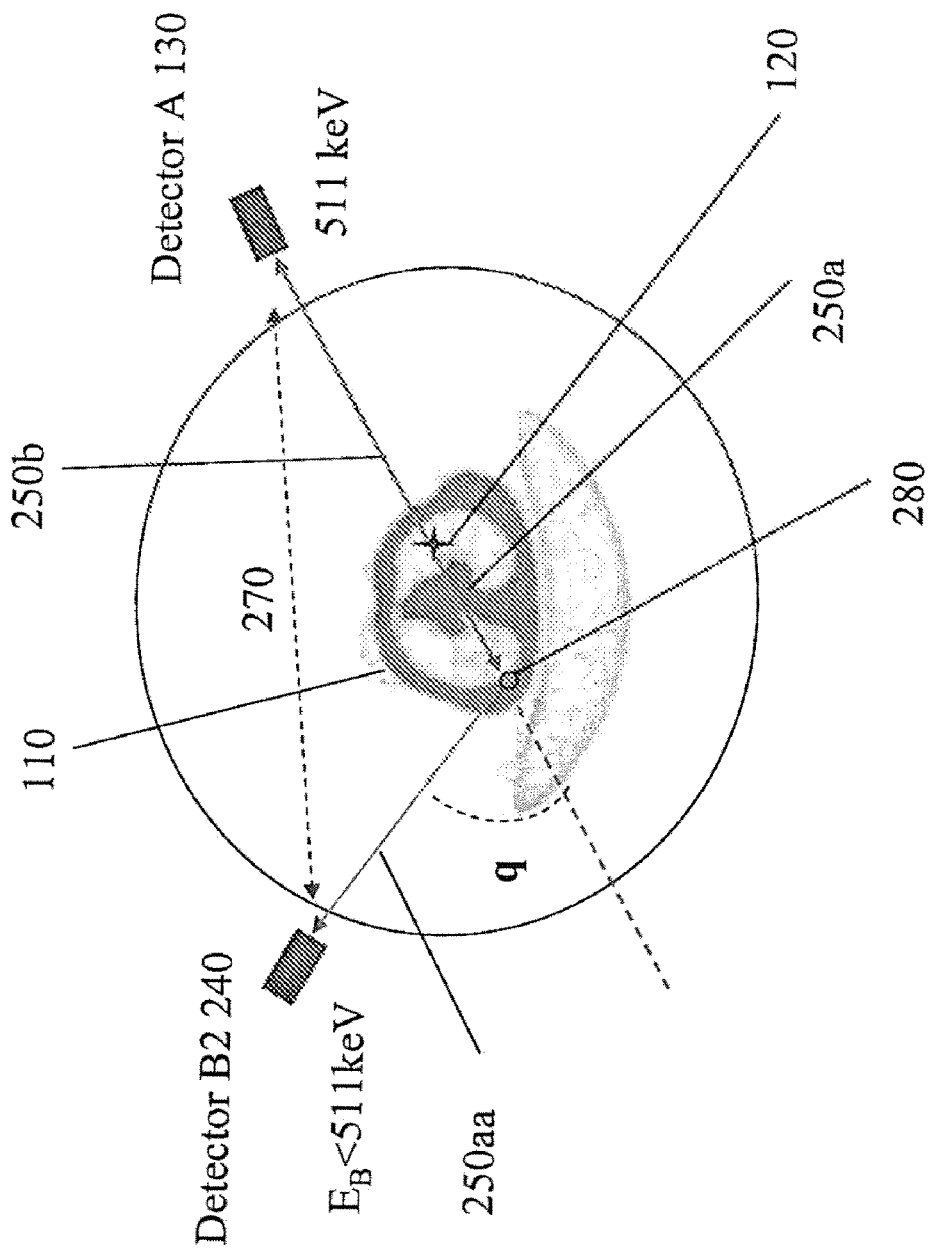
FIG. 2 illustrates a cross section of a patient in a PET scanner with a source of two photons, one of which undergoes Compton scatter. In this case, a straight line joining detector pairs A and B does not provide correct information about the position of the source.

FIG. 2, illustrates an example of a photon pair (paths indicated by 250a, 250aa, and 250b) emitted from a source 120 in which one photon (path indicated by 250a and 250aa) undergoes a Compton scatter. In this case the straight line 270 joining the detector A 130 and B2 240 does not provide correct information about the position of the source 120. The scatter angle θ (deviation from the original direction) and the energy of the scattered photon are related as $$E_{scat} = \frac{E_0}{1 + \frac{E_0}{m_0 c^2}(1 - \cos\theta)} \quad (1)$$

Where $E_0$ is the initial energy of the emitted photon, $m_0$ is mass of the electron the photon scatters off, c is the speed of light, and $E_{scat}$ is the energy of the photon after the scatter event at S 280. This relation can be inverted and the scattering angle can be calculated as a function of the energy of the scattering photon $\theta = f(E_{scat})$.

Figure 3:
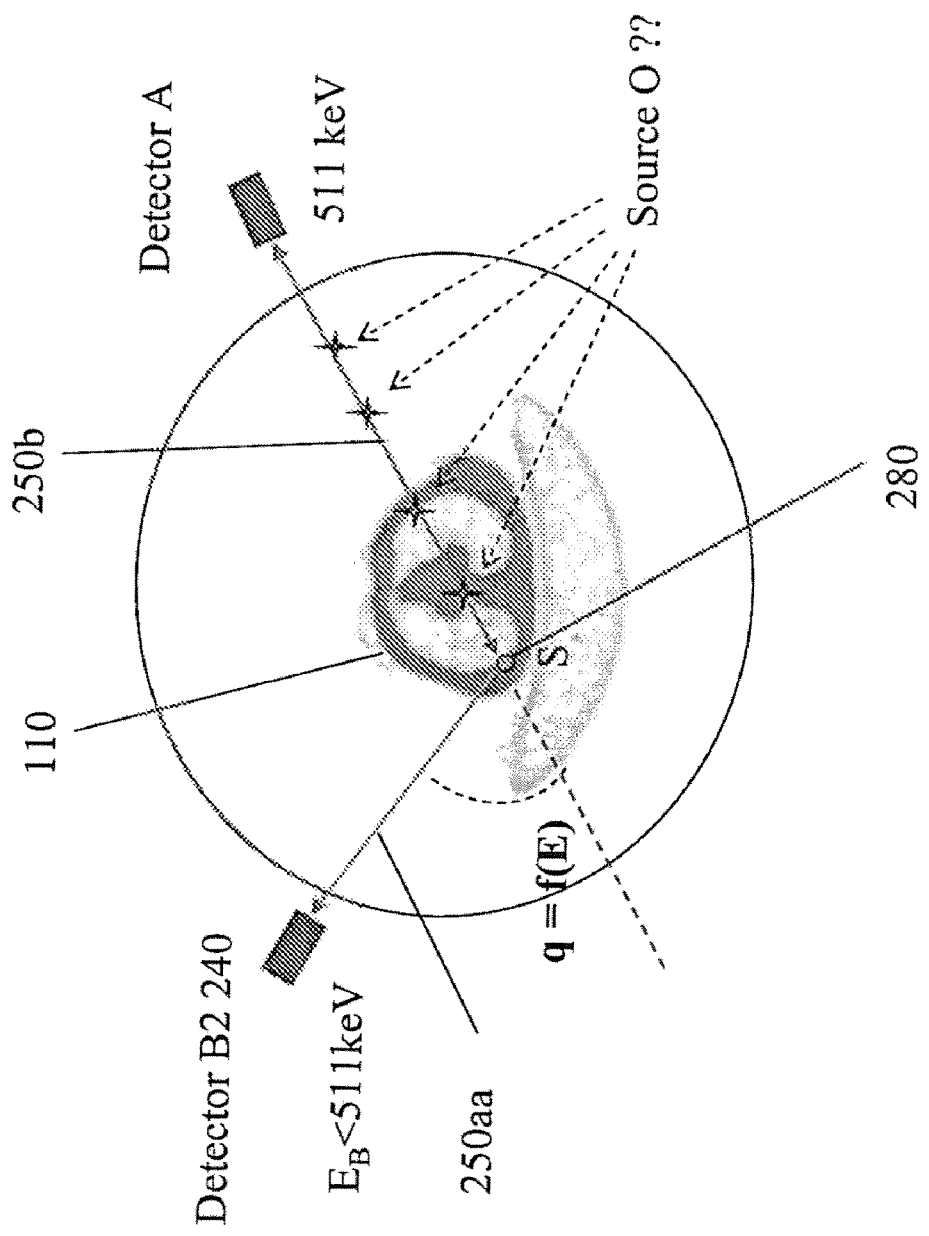
FIG. 3 illustrates a cross section of a patient in a PET scanner with a source of two photons, one of which undergoes Compton scatter. The scatter angle and the energy of the scattered photon are related through eq. (1), the trajectory of the two photons can be identified if the energy $E_{B2}$ is known. But the position of the source is the trajectory cannot be identified.

Knowing the position of detector A 130 and detector B2 240, and the energy $E_0$ and $E_{B2}$ of the photons detected in A and B2, equation (1) defines the trajectory of the two photons in the plane shown in FIGS. 2 and 3. The scattering point S 280 is localized, but there is not enough information to determine (within accuracy of the variables) where the source O is located in the segment SA, the line between the scatter point and detector A. (FIG. 3).

Time-of-flight difference between the two photons can be used to determine the position of the source even if one of both the two photons has undergone a Compton scatter. In particular, the difference of time-of-flight (or arrival time) of the two photons provides the additional information needed to identify the position of the source in the trajectory, as illustrated in FIG. 4.

Figure 4:
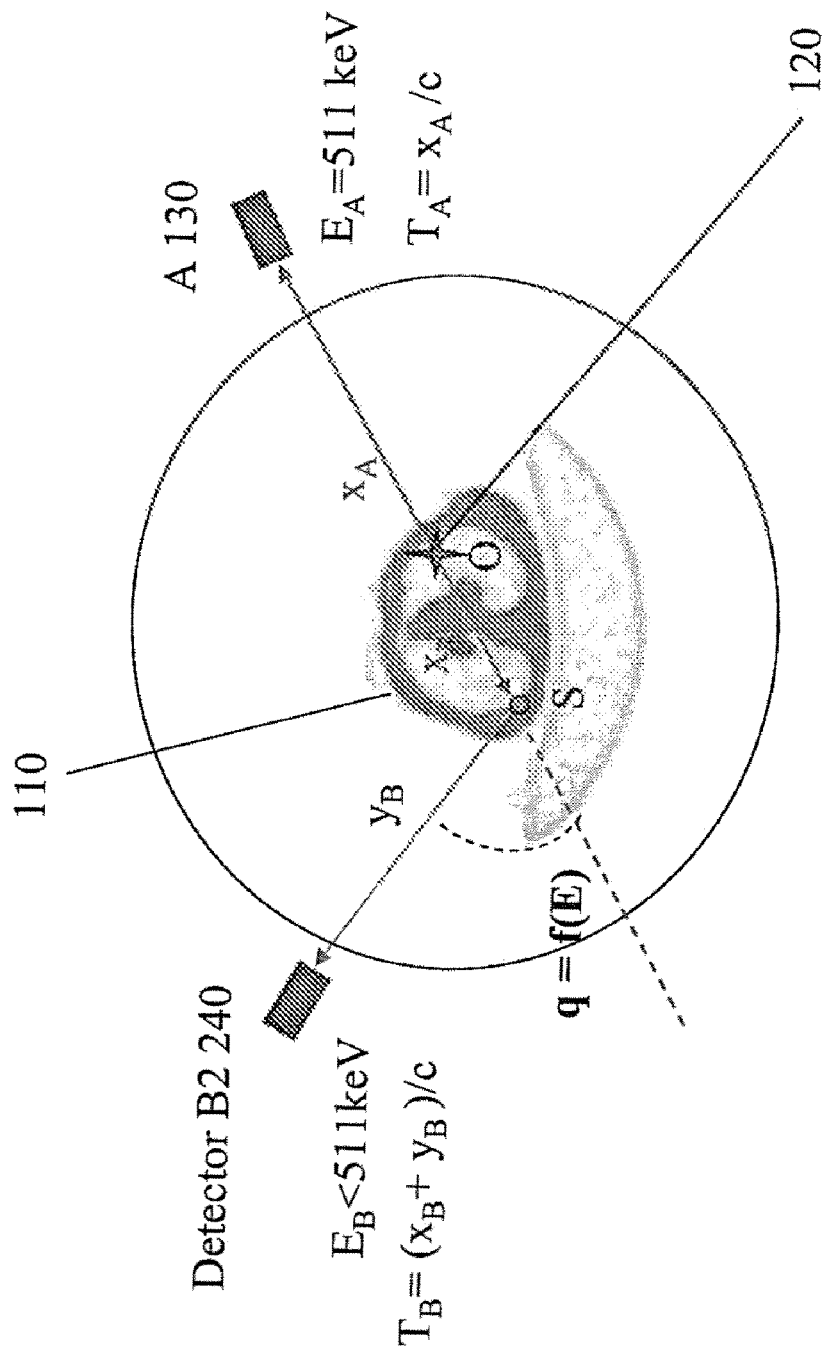
FIG. 4 illustrates a cross section of a patient in a PET scanner with a source of two photons, one of which undergoes a Compton scatter. The scatter angle and the energy of the scattered photon are related through eq. (1) and therefore the trajectory of the two photons can be identified if the energy $E_{B2}$ is known. The difference of time-of-flight (also determinable as the difference in time-of-arrival) provides the additional information needed to identify the position of the source in the trajectory.

Referring to FIG. 4, $T_A$ is the flight time of the unscattered photon at detector A; $T_B$ is the flight time of the scattered photon in detector B; $y_B$ is the length of the segment BS joining detector B2 240 and the scattering point S 280; $x_B$ is the length of the segment SO joining the scattering point S 280 and the unknown source positions O; $x_A$ the length of the segment OA joining the source position O and detector A 130; SA is the segment joining S and A of length $x_B + x_A$; and c the speed of light. $T_A$ and $T_B$ are related to $x_A$, $x_B$, and $y_B$:

$$T_A = \frac{x_A}{c} \quad (2)$$

and $$T_B = \frac{x_B + y_B}{c} \quad (3)$$

The time of flight difference can be expressed as:

$$T_B - T_A = \frac{x_B + y_B - x_A}{c} \quad (4)$$
$$= \frac{(SA - x_A) + y_B - x_A}{c}$$
$$= \frac{SA + y_B - 2x_A}{c}$$

From equation (4) the unknown position $x_A$ can be computed as:

$$x_A = \frac{SA + y_B}{2} - \frac{(T_B - T_A) \cdot c}{2} \quad (5)$$

In equation (5) SA and $y_B$ are determined given the knowledge of the positions of the detectors A 130 and B2 240, and of the photon energy $E_A$ and $E_B$. The time-of-flight difference $T_B - T_A$ is also known in a TOF PET scanner.

The uncertainty of the location of the source O is determined by the uncertainty of the measurement of energy $\Delta E$ and the uncertainty of the measurement of time-of-flight $\Delta T$. Embodiments of the present technology use Equations (1) and (5) as the equations to be included in a projector used in PET reconstruction.

In order to locate the position of the source, the technology can estimate the scatter angle $\theta$ to identify the trajectory, and then estimate the position along the trajectory. The technology can use equation (1) to obtain $\theta$ from $E_{scat}$, and equation (5) to obtain $x_A$ from the time of flight difference $T_B - T_A$. Since the quantities $E_{scat}$ and $T_B - T_A$ are measured with instrumental uncertainties $\Delta E$ (energy resolution) and $\Delta T$ (time resolution), consequently the derived quantities $\theta$ and x are known with uncertainties $\Delta \theta$ and $\Delta x$, that can be derived using from equations (1) and (5). Therefore, in the reconstruction algorithm, forward and back projectors can use a probability function (for example a Gaussian) for the trajectory identification which has as a mean value $\theta$ and a width $\Delta \theta$ and a probability function (for example a Gaussian) for the position identification in the trajectory which has as a mean value x and a width $\Delta x$.

The above description of the technology above is based on a two-dimensional (2D) model, in which all trajectories are in a plane. Alternative embodiments include those employing a 3D geometry. In 3D applications, a set of trajectories on a cone of opening $\theta$ are defined for a detected energy $E_B$. The cone can be used in the projector as described above.

Other embodiments can use a combined technique of rejecting photons below an energy threshold, estimating and subtracting part of scattered events, and accepting part of the scattered events using the method described herein.

In some embodiments, the technology can use additional information on the location of the patient in the FOV of the PET scanner to apply further constraints of the acceptable trajectories. For example, MRI, ultrasound or CT images can be available in multimodality PET scanners. Those images can define the boundary of the volume where the sources can be located.

In some embodiments, the technology can use the additional information to create a pseudo-LOR by identifying the detector a photon likely would have hit had it not been scattered. Pseudo-LORs can supplement true coincidence event LORs in forming the PET image.

PET systems can take the form of hardware and software elements. In some embodiments, the technology is implemented in a PET system in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk— read only memory (CD-ROM), compact disk—read/write (CD-R/W) and DVD. Both processors and program code for implementing each as aspect of the technology can be centralized or distributed (or a combination thereof) as known to those skilled in the art.

A PET data processing system suitable for storing program code and for executing program code will include at least one processor coupled directly or indirectly to memory elements (e.g., computer-readable media) through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers, Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. In a Positron Emission Tomography (PET) system comprising a plurality of detectors, a method for determining the position of a radioactive source, the method comprising:
    detecting a scatter coincidence event, the event characterized by a full-energy photon detected at a first detector and partial-energy photon detected at a second detector of a PET camera; and
    measuring the time difference via time of flight between the time of arrival of the partial energy photon at the second detector and the time of arrival of the full energy photon at the first detector;
    measuring the energy of the partial-energy photon;
    determining a scattering point as a function of at least:
        the position of the first detector, the position of the second detector,
        the measured energy of the partial-energy photon,
        the expected energy of an unscattered photon,
        the mass of a scattering electron,
        and the speed of light; and
    determining the position of a radioactive PET source along a pseudo Line of Response (LOR) between the scatter point and the first detector as a function of at least:
        the distance between scatter point and the first detector,
        the distance between scatter point and the second detector, and
        the measured time difference,
        wherein the pseudo LOR comprises a broken line projection.

2. The method of claim 1, wherein the partial energy photon has a detected energy greater than a predetermined threshold and less than 511 keV.

3. A method for forming a Positron Emission Tomography (PET) image, the method comprising:
    for a plurality of scattering coincident events, the event characterized by a full-energy photon detected at a first detector and partial-energy photon detected at a second detector of a PET camera;
    detecting the scatter coincidence event,
    measuring the energy of the partial-energy photon;
    determining a scattering point as a function of at least:
        the position of the first detector, the position of the second detector,
        the measured energy of the partial-energy photon,
        the expected energy of an unscattered photon,
        the mass of a scattering electron,
        and the speed of light;
    determining a pseudo-Line-Of-Response (LOR) defined by the scattering point and the position of the first detector;
    forming an image from: a plurality of pseudo-LOR, and a plurality of LOR determined from a true coincidence events,
    wherein the pseudo LOR comprises a broken line projection.

4. The method of claim 3, wherein the partial energy photon has a detected energy greater than a predetermined threshold and less than 511 keV.

5. A method for forming a Positron Emission Tomography (PET) image, the method comprising:
    detecting a scatter coincidence event, the event characterized by a full-energy photon detected at a first detector and partial-energy photon detected at a second detector of a PET camera; and
    for a plurality of scattering coincident events, the event characterized by a full-energy photon detected at a first detector and partial-energy photon detected at a second detector;
    detecting the scatter coincidence event,
    measuring the energy of the partial-energy photon;
    measuring the time difference via time of flight between the time of arrival of the partial energy photon at the second detector and the time of arrival of the full energy photon at the first detector;
    determining a scattering point as a function of at least:
        the position of the first detector, the position of the second detector,
        the measured energy of the partial-energy photon,
        the expected energy of an unscattered photon,
        the mass of a scattering electron,
        and the speed of light;
    determining the position of a radioactive PET source along a line between the scatter point and the first detector as a function of at least:
    for each determined position of a radioactive PET source within a predetermined boundary, determining a pseudo-Line-Of-Response (LOR) defined by the scattering point and the position of the first detector;
    forming an image from: a plurality of pseudo-LOR, and a plurality of LOR determined from a true coincidence events,
    wherein the pseudo LOR comprises a broken line projection.

6. The method of claim 5, wherein the predetermined boundary is based on the actual location of the patient in the PET system.

7. A Positron Emission Tomography (PET) system comprising:
    a plurality of detectors of a PET camera;
    a PET data processing system; and
    program code stored on a non-transitory computer readable medium for:
        detecting a scatter coincidence event, the event characterized by a full-energy photon detected at a first detector and partial-energy photon detected at a second detector; and
        measuring the time difference via time of flight between the time of arrival of the partial energy photon at the second detector and the time of arrival of the full energy photon at the first detector;

measuring the energy of the partial-energy photon;
determining a scattering point as a function of at least:
    the position of the first detector, the position of the second detector,
    the measured energy of the partial-energy photon,
    the expected energy of an unscattered photon,
    the mass of a scattering electron,
    and the speed of light; and
determining the position of a radioactive PET source along a pseudo Line of Response (LOR) between the scatter point and the first detector as a function of at least:
    the distance between scatter point and the first detector,
    the distance between scatter point and the second detector, and
    the measured time difference,
    wherein the pseudo LOR comprises a broken line projection.

8. The method of claim 7, wherein the partial energy photon has a detected energy greater than a predetermined threshold and less than 511 keV.

9. A Positron Emission Tomography (PET) system comprising:
a plurality of detectors of a PET camera;
a PET data processing system; and
program code stored on a non-transitory computer readable medium for:
    for a plurality of scattering coincident events, the event characterized by a full-energy photon detected at a first detector and partial-energy photon detected at a second detector;
    detecting the scatter coincidence event,
    measuring the energy of the partial-energy photon;
    determining a scattering point as a function of at least:
        the position of the first detector, the position of the second detector,
        the measured energy of the partial-energy photon,
        the expected energy of an unscattered photon,
        the mass of a scattering electron,
        and the speed of light;
    determining a pseudo-Line-Of-Response (LOR) defined by the scattering point and the position of the first detector;
    forming an image from: a plurality of pseudo-LOR, and a plurality of LOR determined from a true coincidence events,
    wherein the pseudo LOR comprises a broken line projection.

10. The method of claim 9, wherein the partial energy photon has a detected energy greater than a predetermined threshold and less than 511 keV.

11. A Positron Emission Tomography (PET) system comprising:
a plurality of detectors of a PET camera;
a PET data processing system; and
program code stored on a non-transitory computer readable medium for:
    detecting a scatter coincidence event, the event characterized by a full-energy photon detected at a first detector and partial-energy photon detected at a second detector; and
    for a plurality of scattering coincident events, the event characterized by a full-energy photon detected at a first detector and partial-energy photon detected at a second detector;
    detecting the scatter coincidence event, measuring the energy of the partial-energy photon;
    measuring the time difference via time of flight between the time of arrival of the partial energy photon at the second detector and the time of arrival of the full energy photon at the first detector;
    determining a scattering point as a function of at least:
        the position of the first detector, the position of the second detector,
        the measured energy of the partial-energy photon,
        the expected energy of an unscattered photon,
        the mass of a scattering electron,
        and the speed of light;
    determining the position of a radioactive PET source along a line between the scatter point and the first detector as a function of at least:
    for each determined position of a radioactive PET source within a predetermined boundary, determining a pseudo-Line-Of-Response (LOR) defined by the scattering point and the position of the first detector;
    forming an image from: a plurality of pseudo-LOR, and a plurality of LOR determined from a true coincidence events,
    wherein the pseudo LOR comprises a broken line projection.

12. The method of claim 11, wherein the predetermined boundary is based on the actual location of the patient in the PET system.

* * * * *